United States Patent
Hamburg

(10) Patent No.: US 7,327,049 B2
(45) Date of Patent: Feb. 5, 2008

(54) WAVE GENERATOR POWER PLANT

(76) Inventor: Ron Hamburg, 5518 Date Ave., Sacramento, CA (US) 95842

(*) Notice: Subject to any disclaimer, the term of this patent is extended or adjusted under 35 U.S.C. 154(b) by 83 days.

(21) Appl. No.: 11/386,015

(22) Filed: Mar. 22, 2006

(65) Prior Publication Data

US 2007/0222221 A1    Sep. 27, 2007

(51) Int. Cl.
*F03B 13/12* (2006.01)
(52) U.S. Cl. .......................... 290/53; 290/42
(58) Field of Classification Search .......... 290/42, 290/43, 44, 53, 54, 55; 60/497, 507
See application file for complete search history.

(56) References Cited

U.S. PATENT DOCUMENTS

| | | | | |
|---|---|---|---|---|
| 3,970,415 | A * | 7/1976 | Widecrantz et al. | 417/332 |
| 4,319,454 | A * | 3/1982 | Lucia | 60/506 |
| 4,350,014 | A * | 9/1982 | Sanchez et al. | 60/641.7 |
| 4,408,455 | A * | 10/1983 | Montgomery | 60/505 |
| 4,480,966 | A * | 11/1984 | Smith | 417/332 |
| 4,683,720 | A * | 8/1987 | De Shon | 60/496 |
| 4,931,662 | A * | 6/1990 | Burton | 290/42 |
| 5,244,359 | A * | 9/1993 | Slonim | 417/332 |
| 6,269,636 | B1 * | 8/2001 | Hatzilakos | 60/398 |
| 6,956,299 | B2 * | 10/2005 | Serrano Molina et al. | 290/42 |

* cited by examiner

*Primary Examiner*—Nicholas Ponomarenko

(57) ABSTRACT

The Wave Generator Power Plant converts the energy in sea waves into electricity. The wave motor portion of the power plant utilizes a buoyant, moving, semisubmerged, cone-shaped pontoon that is powered by the sea wave motion. The reciprocation is changed to rotary motion by a connecting rod and crankshaft. Then, through a gearbox, the rotary motion drives an electrical generator. The fully submerged, stationary, buoyant, ring-pontoon is anchored to the sea floor by sixteen (16) cables. Also, sixteen (16) columns connecting to it, support the upper above-water structure. The assembly, is a moving buoyant pontoon, reciprocating within an anchored ring-pontoon. Optimum operation takes place in sea waves of adequate height and period that can lift and drop the moving cone-shaped pontoon relative to the design mechanical requirements. Sea wave energy, through the design of this invention, is amassed to develop sixteen hundred (1600) horsepower and generate one ((1) mega-watt of electricity.

2 Claims, 4 Drawing Sheets

WAVE GENERATOR POWER PLANT

CROSS-REFERENCE TO RELATED APPLICATIONS

"Not Applicable"

STATEMENT REGARDING FEDERALLY SPONSORED RESEARCH

"Not Applicable"

REFERENCE TO SEQUENCE LISTING

"Not Applicable"

BACKGROUND OF THE INVENTION

The Wave Generator Power Plant is related to offshore semi-submersible platforms used in the petroleum industry. The floating semi-submersible platforms are anchored to the sea floor with cables and their buoyancy supports the upper deck structure. They are widely used throughout the world for offshore applications. The Wave Generator Power Plant uses an anchored ring-pontoon, that is fully submerged and its buoyancy supports the above-water structure. Within the anchored ring-pontoon the moving buoyant cone-shaped pontoon reciprocates similarly to a ship at sea that is lifted and dropped with the action of the sea waves. The reciprocation is converted into rotary motion by a connecting rod and crankshaft, and this rotary power then drives an electrical generator. Sea wave energy is amassed with this buoyant prime mover and sixteen hundred (1600) horsepower can be developed to generate one (1) megawatt of electricity. The horsepower of this invention increases with an increase in the area and depth of the cone-shaped pontoon that is in contact with the sea.

The moving cone-shaped pontoon is also similiar to a single piston reciprocating engine. This cone-shaped pontoon resembles an inverted piston set into motion by sea wave oscillations. This motion is then converted into rotation with a connecting rod and crankshaft as are all reciprocating engines. Ballast is added to the moving cone to accommodate varying wave heights, return drop, and inertial lateral movement control. The specific gravity of the material used for ballast may vary from 2.5 to 21.5 or more. The cone extension of the cone-shaped pontoon is the location designed to carry this ballast.

The mechanical requirements are determined by site-specific ocean wave data. The Significant Wave Height and the Average Wave Period are both used in calculating the necessary cone-shaped pontoon area to amass sixteen-hundred (1600) horsepower, to size the main gear diameter, and to determine the crankshaft offset. The ocean wave data included in the drawings (FIGS. 4A and 4B) would determine the following: Average significant wave height is seven (7.0) foot, the average wave period is seven and one-half (7.5) seconds, this would require a one-hundred and sixty (160) foot diameter cone-shaped pontoon, a thirty-two (32) foot diameter main gear, and a three and one-half (3.5) foot offset at the crankshaft for a seven (7.0) foot connecting rod stroke. These mechanical specifications would result in sixteen-hundred (1600) horsepower @ two-thousand (2000) revolutions per minute (RPM) at the electrical generator to produce one (1) megawatt of electricity.

Present-day gasoline and diesel engines that drive one (1) megawatt electrical generators are also related to this power plant invention.

SUMMARY OF THE INVENTION

In summary of this invention, prime movers that utilize the free forms of energy, namely sea wave, wind and solar energy sources, have become more cost effective when using these systems to produce electrical power. Inventions like the Wave Generator Power Plant have low operating costs and a profit is seen sooner when selling electricity to utility companies or to utility customers. The renewable sea wave energy will be available for many years to come.

The Wave Generator Power Plant is operable in oceans and large lakes. Wave recorded data such as the Significant Wave Height and the Average Wave Period are used to design the crankshaft and flywheel. This design is site specific and varies as to the recorded data. Some operating limitations would include locations where the water surface is frozen or locations where the seas are too calm. In considering installations in near shore locations, the shape of the moving buoyant pontoon is slightly modified to operate in ocean tide waves. The Wave Generator Power Plant can be used for both sea wave and tide wave applications. The best operation takes place in sea waves of adequate height and period that can lift and drop the moving buoyant pontoon relative to the design stroke distance and to the design revolutions per minute (RPM) requirements. Sea wave energy is transferred to the buoyant pontoon and amasses enough force to develop sixteen hundred (1600) horsepower and generate one (1) megawatt of electricity. A power plant of several wave generators, each one producing one (1) megawatt of electricity, could result in an appreciable five hundred (500) megawatts generated per one (1) square mile of ocean surface. Existing offshore wind generator power plants considering increasing plant output capacity, could find that the combination of wind and wave generators the answer.

BRIEF DESCRIPTION OF SEVERAL VIEWS OF THE DRAWING

Here in these drawings, the general layout of the Wave Generator Power Plant is depicted. The drawings show the entire invention and details of the main mechanical features. Graphs of recorded ocean wave data are included. This data is used in determining the cone-shaped pontoon diameter, the main gear diameter, and the crankshaft offset. The primary data is the average significant wave height and the average wave period. With this data the resulting mechanical specifications convert sea wave energy into sixteen-hundred (1600) horsepower at two-thousand (2000) revolutions per minute (RPM), delivered to the electrical generator and one (1) megawatt of electricity is produced.

DETAILED DESCRIPTION OF THE INVENTION

The most preferred mode contemplated for this invention, is that the Wave Generator Power Plant be placed in ocean waves sufficient in height to lift and drop the moving cone-shaped pontoon adequately and synchronously to the design mechanical requirements. The mechanical requirements are determined by recorded ocean wave data. The Significant Wave Height and the Average Wave Period are primarily used. The moving cone-shaped pontoon is lifted and dropped during one (1) cycle or revolution.

The operation sequence of the Wave Generator Power Plant is as follows: Sea waves push against the semi-submerged surface of the cone-shaped pontoon. It is set into motion and reciprocates up and down similiar to a small ship at sea. The buoyancy of the cone is determined by the volume of displaced seawater compared with the volume occupied by the vacuum-filled cone. The result is a high buoyancy to weight ratio, higher than any ships. This then allows for constrained reciprocation that can be used to create rotary motion with a connecting rod and crankshaft. The main gear or flywheel connected to the crankshaft insures that the necessary revolutions per minute (RPM) are obtained at the electrical generator.

The lower, stationary, fully-submerged, cable-anchored, ring-pontoon is also buoyant and supports the upper above-water structure. When the ring is pulled down into position, the buoyant force is enough to support this system and apply tension to the anchoring cables. There are sixteen (16) cables that extend down to anchors embedded into the seafloor. The materials used to construct and fabricate the moving parts should be strong, lightweight and non-corrosive. The submerged and stationary portions can be steel that is galvanized and epoxy coated.

Figure 1:
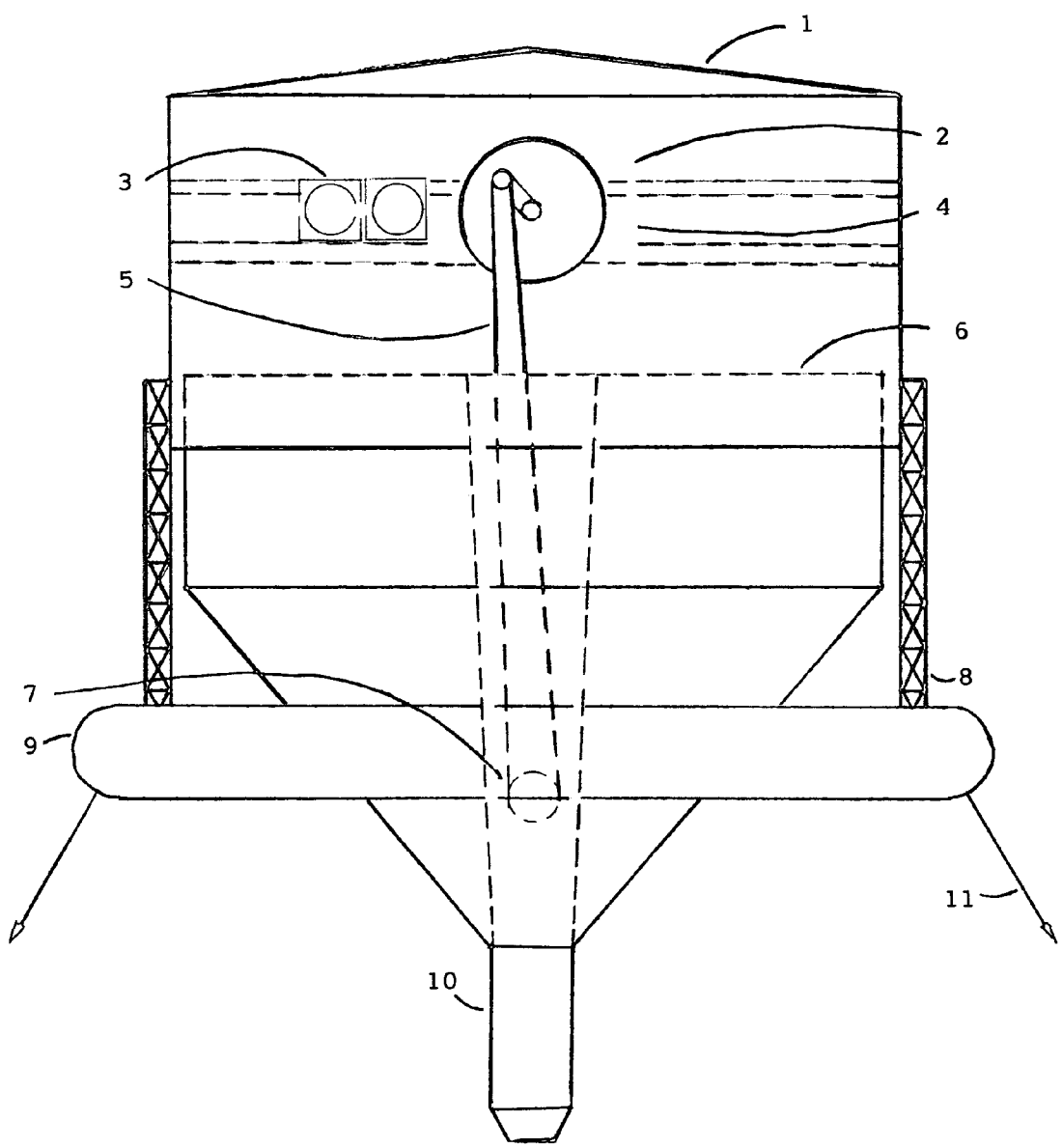
FIG. 1 is a side view of the Wave Generator Power Plant. The drawing shows: (1) the exterior cylindrical housing, (2) the main gear or flywheel, (3) the electrical generator, (4) the crankshaft, (5) the connecting rod and rod bearing, (6) the moving, vacuum-filled, cone-shaped pontoon, (7) the connecting rod and wrist pin bearing, (8) the three-sided, diagonally braced columns, (9) the stationary, anchored, vacuum-filled, ring-pontoon, (1) the cone extension where ballast is carried. (1) the anchoring cables. Sixteen cables anchor the structure to the sea floor.
Figure 2:
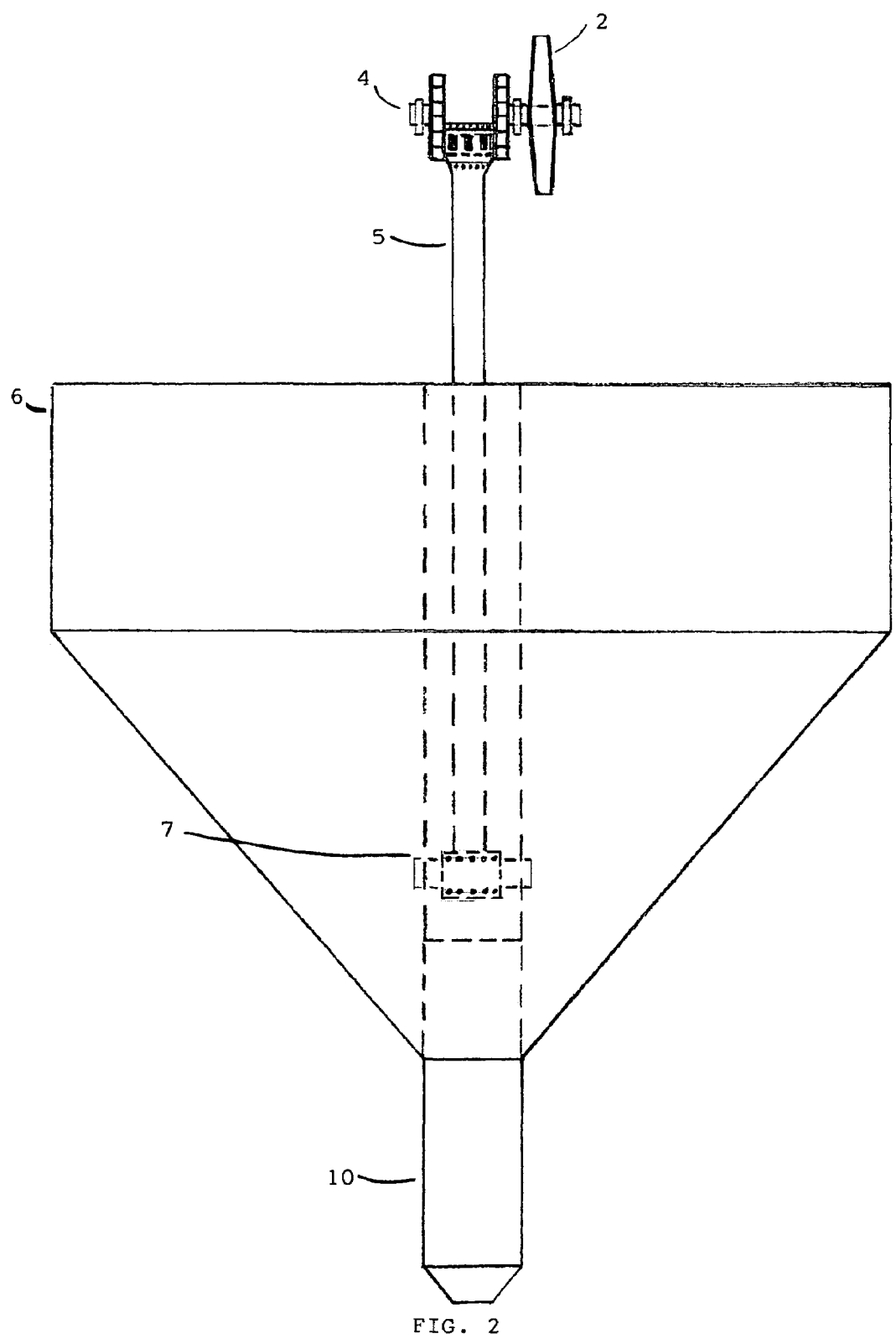
FIG. 2 is a detail of the (2) aluminum main gear, (4) aluminum crankshaft, (5) aluminum connecting rod and rod bearing assembly, (6) aluminum vacuum-filled cone-shaped pontoon, (7) aluminum connecting rod and wrist pin bearing assembly, (1) aluminum cone extension.
Figure 3:
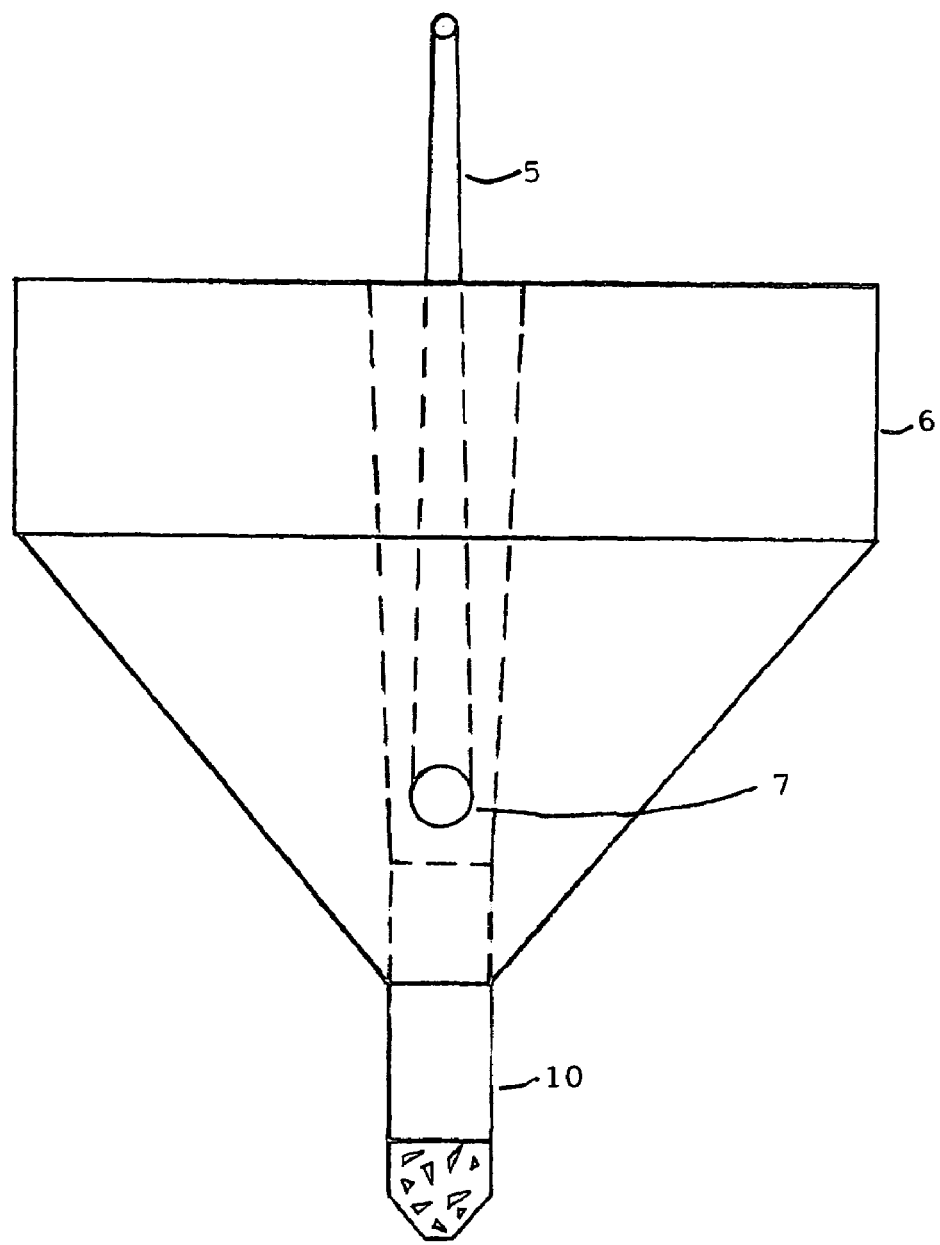
FIG. 3 is a detail of the aluminum (5) connecting rod, (6) cone-shaped pontoon, (10) cone extension.
Figure 4A:
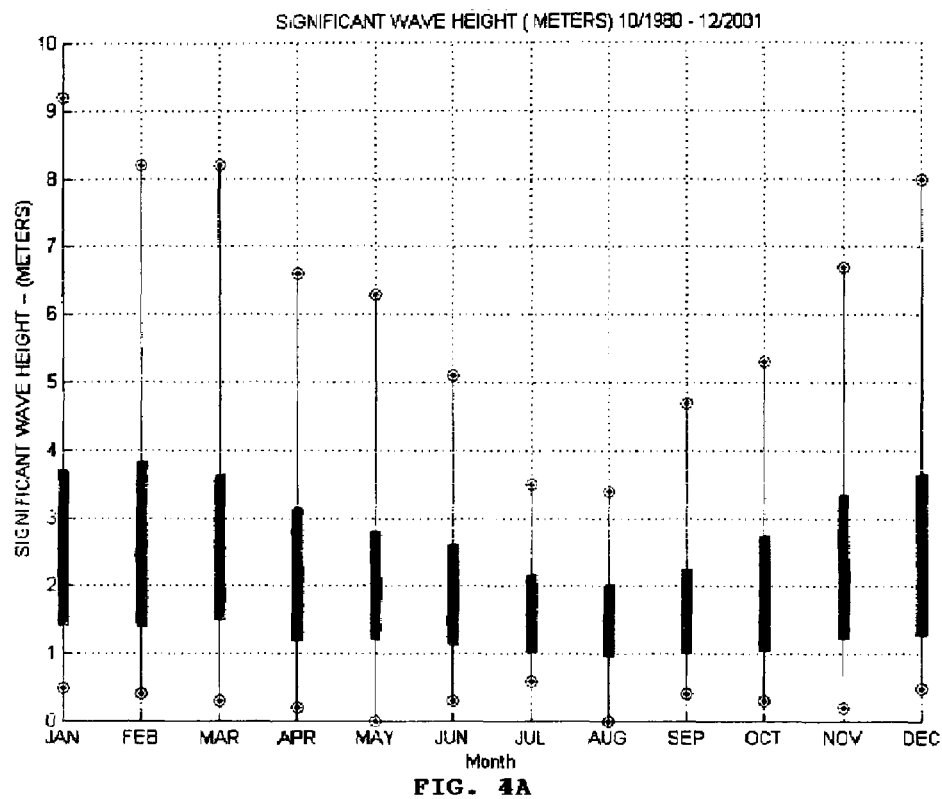
FIGS. 4A and 4B is recorded ocean wave data.
Figure 4B:
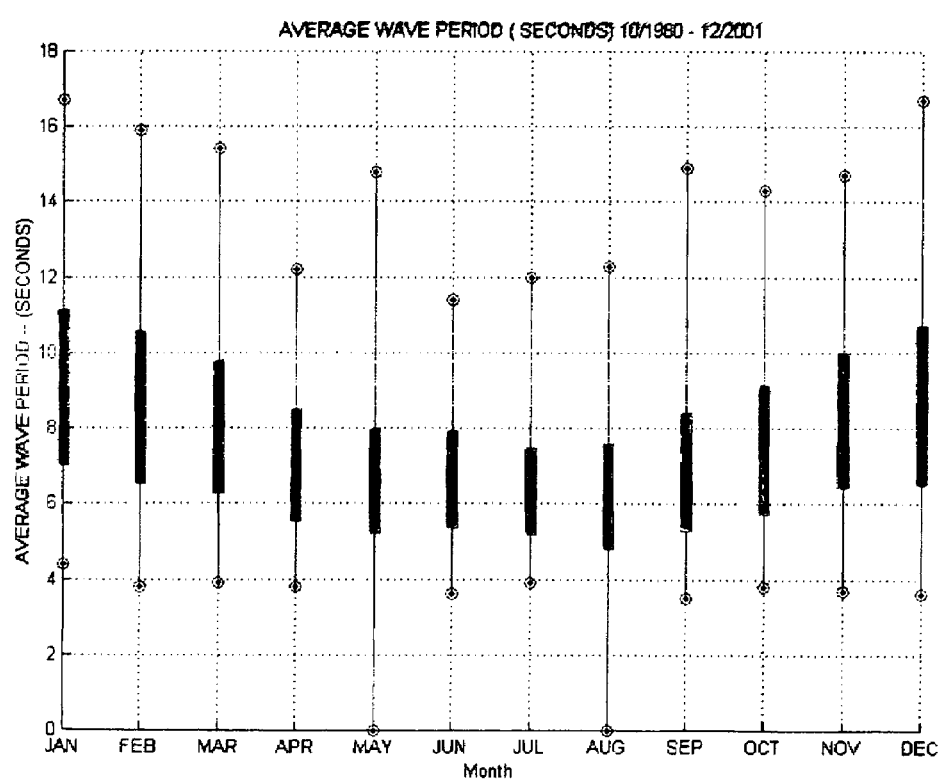

The Wave Generator Power Plant invention illustrated in FIG. 1, FIG. 2, and FIG. 3 is described as follows:

1 is the above-water cylindrical exterior housing, that encloses the upper portion of the moving pontoon, the connecting rod, crankshaft, gearbox and electrical generator. The sixteen (16) columns attached to it extend from the ring-pontoon, they are evenly spaced around the perimeter of this upper exterior housing.

2 is the main gear or flywheel that is aluminum and specifically sized from recorded ocean wave data in the area power plant is built.

3 is an electrical generator requiring approximately sixteen-hundred horsepower at two-thousand revolutions per minute (RPM) to produce one (1) megawatt of electricity.

4 is the aluminum crankshaft with two (2) rotors and a design crankshaft offset determined from recorded site-specific ocean wave data.

5 is the aluminum connecting rod and an encased rod bearing assembly that is sealed with gaskets, nuts and bolts, and rubber seals in contact with the crankshaft journals.

6 is the moving, partially submerged, buoyant, vacuum-filled, cone-shaped, aluminum pontoon. This buoyant cone amasses upward force due to the large conic area exposed to the sea wave energy.

7 is the lower connecting rod wrist pin connection. The bearing is encased in an aluminum housing, lubricating oil within the case is sealed in by gaskets, nuts and bolts and rubber seals at both ends of aluminum case.

8 are the diagonally braced, three-sided, steel columns. There are sixteen (16) columns that are welded to the ring-pontoon and then also welded to the upper exterior housing.

9 is the stationary, buoyant, vacuum-filled, ring-pontoon that is anchored to the sea floor.

10 is the cone extension, high specific gravity ballast is carried in this location.

11 are the sixteen (16) cables anchoring structure.

The invention claimed is:

1. A wave energy power generating system comprising:
   a moving cone-shaped pontoon with a cone extension caring a ballast;
   a stationary, anchored, not-moving, vacuum-filled, ring-pontoon;
   a cylindrical exterior housing fixed to said ring-pontoon and providing an enclosure and direction for said cone-shaped pontoon allowing it to move with the movement of the waves;
   a crankshaft positioned on said housing and connected to an electrical generator through a gear;
   an aluminum rod with a bearing connected to said cone-shaped pontoon and capable to move with the movement of the pontoon and to rotate said crankshaft.

2. A wave energy generating system as in claim 1, wherein the process of generating electricity by means of reciprocating buoyant cone-shaped pontoon by transferring power from said pontoon to said crankshaft and to said generator has a flywheel to stabilize the rotation process.

* * * * *